(12) United States Patent
Bopp et al.

(10) Patent No.: US 11,590,936 B2
(45) Date of Patent: Feb. 28, 2023

(54) CLEANING APPARATUS FOR CLEANING A SURFACE OF A SENSOR APPARATUS

(71) Applicant: Continental Automotive GmbH, Hannover (DE)

(72) Inventors: Thomas Bopp, Frankfurt am Main (DE); Torsten Hahn, Frankfurt am Main (DE)

(73) Assignee: Continental Automotive GmbH

( * ) Notice: Subject to any disclaimer, the term of this patent is extended or adjusted under 35 U.S.C. 154(b) by 109 days.

(21) Appl. No.: 17/025,038

(22) Filed: Sep. 18, 2020

(65) Prior Publication Data

US 2021/0086727 A1 Mar. 25, 2021

(30) Foreign Application Priority Data

Sep. 25, 2019 (DE) ..................... 10 2019 214 705.4

(51) Int. Cl.
*H04N 5/225* (2006.01)
*B60S 1/56* (2006.01)
(Continued)

(52) U.S. Cl.
CPC ........ *B60S 1/56* (2013.01); *B08B 3/02* (2013.01); *B08B 13/00* (2013.01); *B60S 1/52* (2013.01);
(Continued)

(58) Field of Classification Search
CPC .. B08B 13/00; B08B 3/02; B08B 5/02; G01S 17/931; G01S 2007/4977; G01S 7/4813; G01S 7/497
See application file for complete search history.

(56) References Cited

U.S. PATENT DOCUMENTS 10,293,794 B2   5/2019   McAndrew
11,148,609 B2   10/2021  Robertson, Jr. et al.
(Continued)

FOREIGN PATENT DOCUMENTS

CN  106536296 A  *  3/2017  ............... B60R 1/00
DE  10225151 A1     12/2003
(Continued)

OTHER PUBLICATIONS

German Search Report for German Application No. 10 2019 214 705.4, dated Mar. 3, 2022, with partial English translation, 11 pages.

*Primary Examiner* — Md N Haque
(74) *Attorney, Agent, or Firm* — RatnerPrestia

(57) ABSTRACT

An optically, aerodynamically and economically optimized and particularly wind-insensitive cleaning apparatus for cleaning a surface of a sensor apparatus of a vehicle with a fluid cleaning agent. The surface is delimited by an encircling outer edge which is arranged so as to be substantially flush with a surrounding outer surface region, and the cleaning apparatus includes a flow body for guiding a fluid stream flowing from the spray nozzle to the surface and flowing away from the surface, wherein the flow body at least sectionally adjoins the outer edge of the surface, in particular completely surrounds the outer edge, and, at the outer edge, an outer surface of the flow body is oriented so as to be substantially tangential to the adjoining surface.

15 Claims, 3 Drawing Sheets

(51) Int. Cl.
  *B60S 1/54*    (2006.01)
  *B08B 13/00*   (2006.01)
  *B08B 3/02*    (2006.01)
  *B60S 1/52*    (2006.01)
  *G01S 7/497*       (2006.01)

(52) U.S. Cl.
  CPC ............ *B60S 1/54* (2013.01); *H04N 5/22521* (2018.08); *G01S 7/497* (2013.01); *G01S 2007/4977* (2013.01)

(56) References Cited

U.S. PATENT DOCUMENTS

| | | | |
|---|---|---|---|
| 2011/0073142 A1 | 3/2011 | Hattori et al. | |
| 2011/0292212 A1* | 12/2011 | Tanabe | B05B 1/08 |
| | | | 348/148 |
| 2015/0138357 A1* | 5/2015 | Romack | H04N 5/23203 |
| | | | 348/148 |
| 2017/0259789 A1* | 9/2017 | McAndrew | B60S 1/528 |
| 2017/0297536 A1 | 10/2017 | Giraud et al. | |
| 2018/0194328 A1 | 7/2018 | Numakunai | |
| 2019/0135239 A1* | 5/2019 | Rice | B60S 1/56 |
| 2020/0001832 A1* | 1/2020 | Deane | B60S 1/52 |
| 2020/0238955 A1* | 7/2020 | Walse | B60S 1/56 |

FOREIGN PATENT DOCUMENTS

| | | |
|---|---|---|
| DE | 102014117165 A1 | 5/2016 |
| DE | 102018125538 A1 | 4/2020 |
| DE | 102020102678 A1 | 8/2020 |
| WO | 2018188822 A1 | 10/2018 |

\* cited by examiner

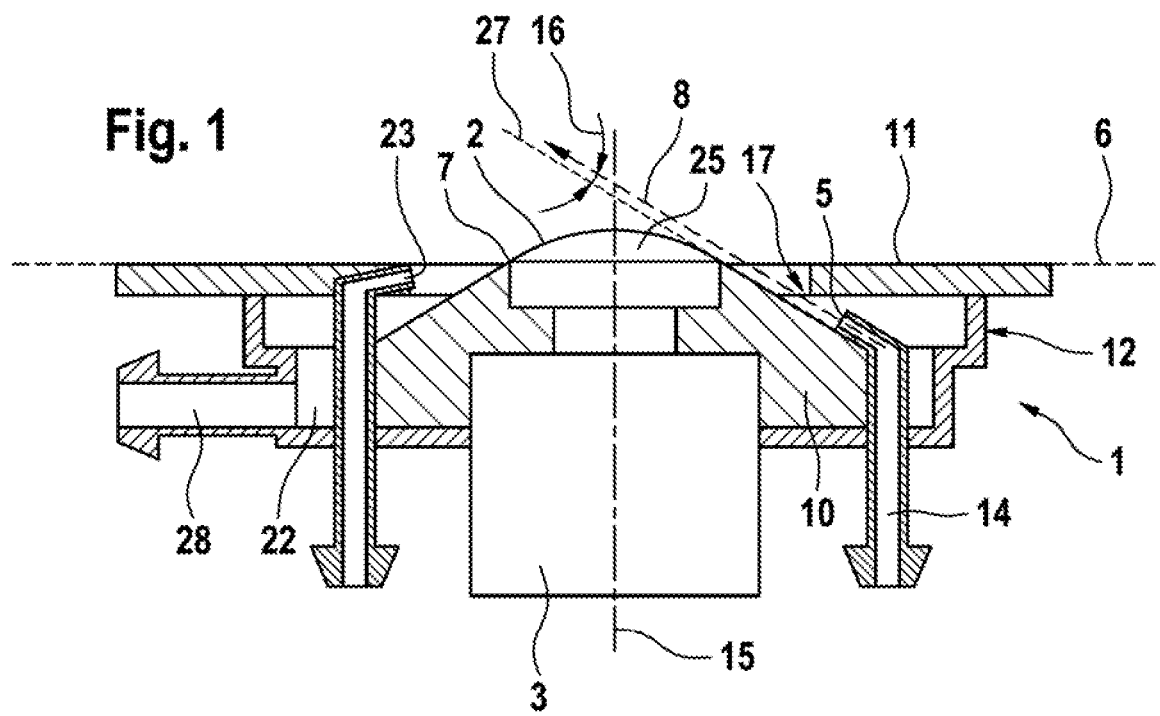
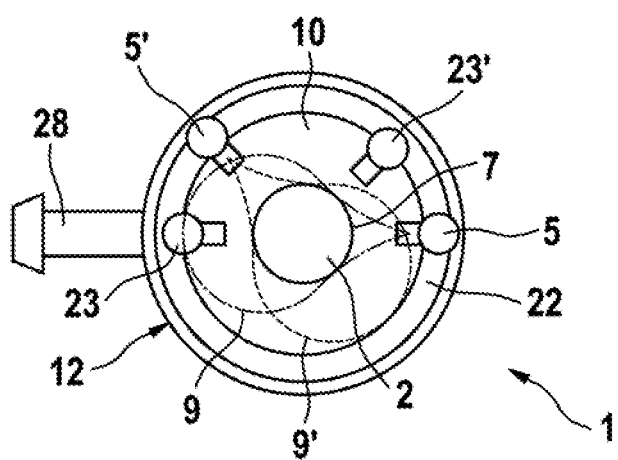
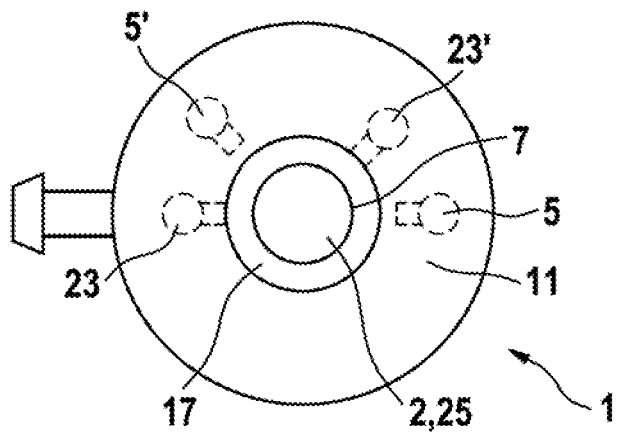

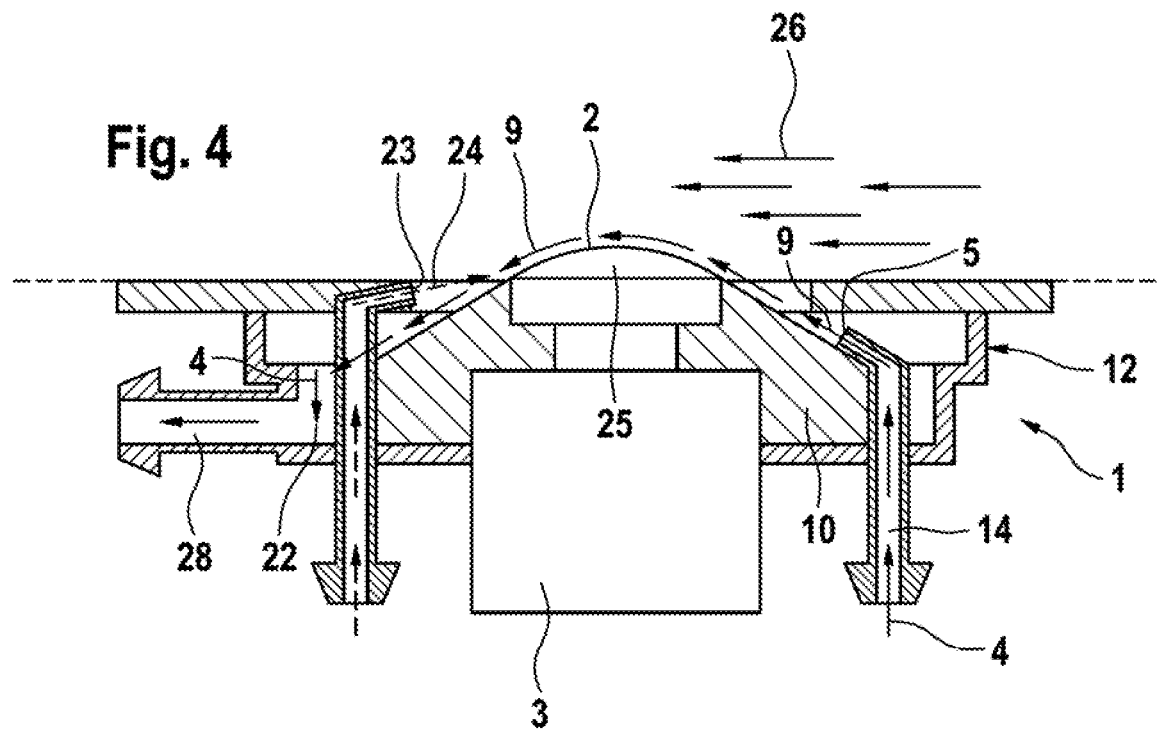
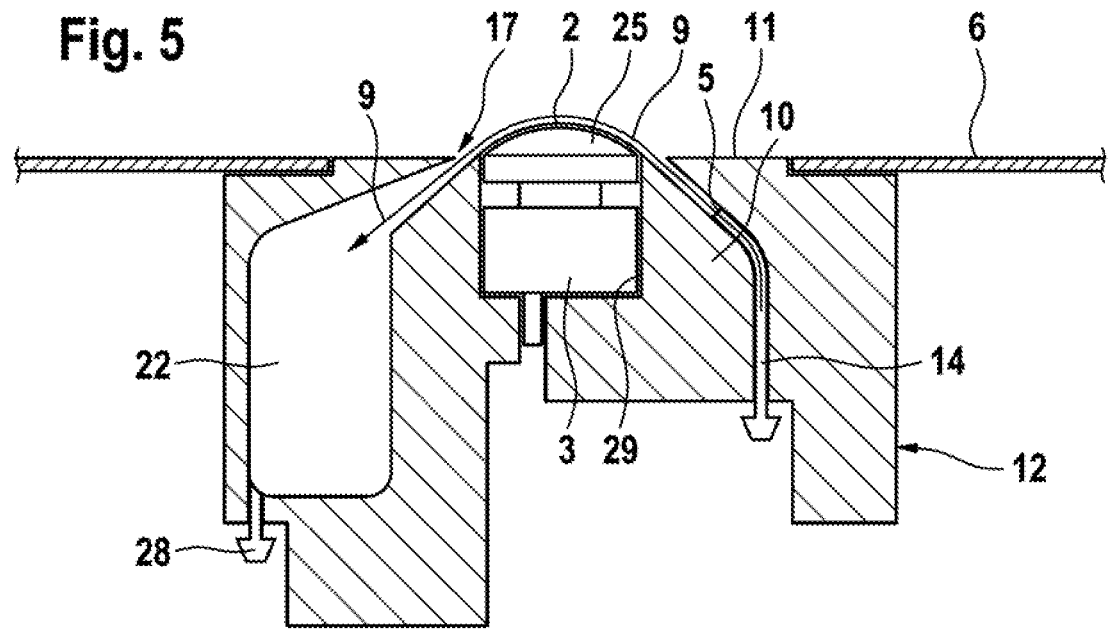

CLEANING APPARATUS FOR CLEANING A SURFACE OF A SENSOR APPARATUS

CROSS REFERENCE TO RELATED APPLICATIONS

This application claims priority to German Patent Application No. 10 2019 214 705.4, filed Sep. 25, 2019, the contents of such application being incorporated by reference herein.

FIELD OF THE INVENTION

The invention relates to a cleaning apparatus for cleaning a surface of a sensor apparatus, in particular a camera lens or an outer cover of a lidar, and to a structural unit comprising the cleaning apparatus and the sensor apparatus, and to a sensor system for detecting vehicle surroundings that comprises at least one of the components mentioned above.

BACKGROUND OF THE INVENTION

Assistance systems with sensors are nowadays increasingly installed in motor vehicles, and are intended to assist the vehicle user when the vehicle is being driven while reliably detecting and monitoring the surroundings of the vehicle at all times. Such assistance systems comprise for this purpose optical or optoelectronic apparatuses such as for example cameras and laser-based or infrared sensors. Such apparatuses have transparent elements such as lenses or covers, which, depending on the usage situation, let the light pass through without limitation or in a specific limited wave range. Such transparent elements are often of outwardly convex or domed form so as to allow, for example, a particularly wide detection range for a camera, in the manner for example of so-called fisheye camera lenses. Furthermore, such transparent elements are, for functional reasons, arranged on the outside of the vehicle and are therefore exposed to contamination and external weather influences and, for ensuring functionality, must be cleaned as required.

What is considered to be an undesired accompanying effect with the known cleaning systems is the fact that the water mixture with glycol and surfactants that is frequently used as cleaning agent, after being sprayed from the nozzle, can, in an uncontrolled manner, run on body parts and dry there so as to leave behind visible traces, which leads to smears and esthestic to functional impairments.

Furthermore, for a duration of functional assurance of optical or optoelectronic apparatuses that is acceptable to a customer, a large supply of cleaning agent must be carried on board, with disadvantages for the utilization of the little available structural space in the vehicle and for the operating costs.

There is thus a desire to reduce the usage and the required supply. It is known to tackle this problem by providing in the cleaning apparatus means for collecting and possibly returning the sprayed cleaning agent.

WO 2018/188822 A1, incorporated herein by reference, for example, has disclosed a cleaning apparatus for a camera lens that has a spray nozzle which is positioned laterally, eccentrically with respect to the sensor axis and with a protrusion with respect to the lens. A collection slot for the cleaning fluid is arranged in the housing surface opposite the spray nozzle behind the lens.

A further aspect is the fact that, for detecting the surroundings of a vehicle, cameras normally have particularly wide viewing angles of 180° and more. The protruding structures may cover a part of the field of view, with the result that possible sources of danger are not detected. Moreover, the aerodynamics are adversely affected, the relative wind being able to generate undesired swirling which disturbs the cleaning jet. Moreover, visible exposed cleaning components are also undesired for design reasons.

As a remedy, it is known to use lifting nozzles which are movable in a piston-like manner and which are extended from a retracted, concealed parking position into a protruding operating position only when required.

DE 10 2014 117 165 A1, incorporated herein by reference, has disclosed a cleaning apparatus in which the lifting nozzle is a part of an extendable annular piston which forms, opposite the nozzle opening, a half-shell-shaped catching body which diverts the sprayed cleaning liquid into an internal collecting chamber.

However, such systems are complex, expensive, susceptible to wear and sensitive to environmental influences, and also require more structural space. At the same time, the field of view is in part considerably obstructed, at least during the spraying process.

Moreover, a common feature of all the known cleaning systems is the problem of sensitivity to wind. As a result of the relative wind, the cleaning jet can be diverted so greatly that the surface to be cleaned is wetted with cleaning liquid incompletely to not at all.

In order to mitigate this effect, it is known to increase the pressure and quantity of cleaning liquid per cleaning process. This reduces the efficiency of the system, and requires a larger supply of the cleaning agent and system components which have larger dimensions and are thus more expensive.

SUMMARY OF THE INVENTION

Against this background, an aspect of the invention is an improved cleaning apparatus, which overcomes the aforementioned disadvantages and in the process is able be produced and assembled as inexpensively as possible.

An aspect of the invention provides that the cleaning apparatus comprises a stationary flow body which serves at least for guiding away a fluid stream flowing away from the surface, wherein the flow body at least sectionally adjoins the outer edge of the surface to be cleaned and preferably completely surrounds said outer edge. Here, in the region of the outer edge, the outer surface of the flow body is oriented so as to be substantially tangential to the adjoining surface to be cleaned.

According to a preferred refinement, the flow body simultaneously serves for guiding a fluid stream flowing from the spray nozzle to the surface.

By means of such a configuration, the physical effects known generally as the Coandă effect and the Bernoulli effect may be utilized even at relatively low fluid speeds. These effects cause the cleaning agent to be sucked to the surface and to follow the contour thereof. This makes the cleaning process insensitive to wind, the cleaning action being reliable at high speeds too and the supply pressure and quantity of the cleaning agent per cleaning cycle being able to be reduced. Furthermore, the used cleaning fluid can be collected in a targeted, loss-free and forced manner, thereby promoting effective recovery. Unappealing run-off traces on surrounding body surfaces are avoided.

An aspect of the invention also provides that, in relation to an outer surface region surrounding the surface to be cleaned, the nozzle is positioned in a recessed manner such that the spraying of the cleaning agent is realized below the outer surface region.

Due to the recessed installation of the nozzle, the detection range or the field of measurement of the sensor apparatus, even at large opening angles of around 180° or more, is not obstructed or restricted at any time during operation by any protrusions or disruptive contours. At no time is the functioning of the sensor apparatus impaired.

For flexible positioning and simple production and, if appropriate, assembly, the flow body may be formed so as to be, favorably in terms of flow, substantially curved like a dome or conical.

In its preferred embodiment, an aspect of the invention provides that the outer edge of the surface to be cleaned is arranged so as to be substantially flush with a surrounding outer surface region, and the flow body is thus arranged below the outer surface region. As a result, in this way, only the functionally relevant part of the sensor apparatus is above the surrounding outer region. An optically and aerodynamically highly optimized surface without protruding elements can be realized. The cleaning elements are neither visible to a person from the outside nor form aerodynamic sources of disturbance, which could be the cause of undesired swirling of the air flow and noises.

For particularly efficient and optically appealing collection of the cleaning fluid while avoiding optical or functional impairments, the cleaning apparatus may comprise a housing with a front surface which is configured so as to be flush with the surrounding outer surface region, wherein the surface to be cleaned is at least regionally and preferably completely surrounded by the front surface, and wherein an annular gap is present between the outer edge of the surface and the front surface, which annular gap at least sectionally and preferably completely borders the surface so as to run along the outer edge.

The effective collection and concentrated return of the used cleaning fluid are made possible in that, in the housing, provision is made below the front surface of a collecting chamber for collecting the cleaning agent whose inlet is formed by the annular gap.

In particular, the collecting chamber may be configured as a type of trough into which the flow body is mounted.

According to a further advantageous refinement of the invention, the cleaning apparatus may comprises at least one blowing nozzle for blowing out an air stream in the direction of the surface, which at least one blowing nozzle is likewise arranged in a stationary manner below the outer surface region. Here, quick and efficient removal of water drops or condensation from the surface to be cleaned, for example after a cleaning process, or in case of rain, froth or fog, is made possible.

A further embodiment of the invention provides that multiple spray nozzles and/or blowing nozzles may be installed or integrated in the cleaning apparatus so as to be spaced apart from one another in a circumferential direction about the sensor axis.

This allows for example particularly flexible, optimal matching of the cleaning apparatus to the respective purpose of use or place of use to be realized. In this regard, use may be made for example of spray nozzles with different characteristics or jet forms, it also being simply possible however for the power of the cleaning apparatus to be increased.

The cleaning apparatus according to an aspect of the invention can be used particularly effectively together with a digital camera or a lidar.

An aspect of the invention also claims a structural unit comprising at least one cleaning apparatus according to an aspect of the invention and at least one sensor apparatus.

An aspect of the invention further claims a sensor system for detecting vehicle surroundings, comprising at least one cleaning apparatus according to an aspect of the invention and/or structural unit according to an aspect of the invention.

An aspect of the invention also claims an advantageous method for operating a cleaning apparatus which contains multiple spray nozzles. According to the method, during cleaning operation, the spray nozzles are to be actuated in an alternating manner and not simultaneously. In this way, a situation in which the different fluid streams impede one another and in the process reduce the cleaning efficiency, but in particular the collecting efficiency, is avoided. The blowing nozzles, by contrast, may be operated in parallel.

BRIEF DESCRIPTION OF THE DRAWINGS

An aspect of the present invention will be discussed in more detail below on the basis of various exemplary embodiments. In the figures:

FIG. 1 shows a simplified cross-sectional illustration of a first embodiment according to the invention, FIG. 2 shows, in plan view, the embodiment as per FIG. 1 without a front surface, FIG. 3 shows, in plan view, the embodiment as per FIG. 1 with a front surface, FIG. 4 shows a simplified illustration of the functioning of the embodiment as per FIG. 1 in the presence of relative wind, FIG. 5 shows another embodiment according to the invention with a domed flow body and with integrated spray nozzles.

DETAILED DESCRIPTION OF THE PREFERRED EMBODIMENTS

Figure 6:
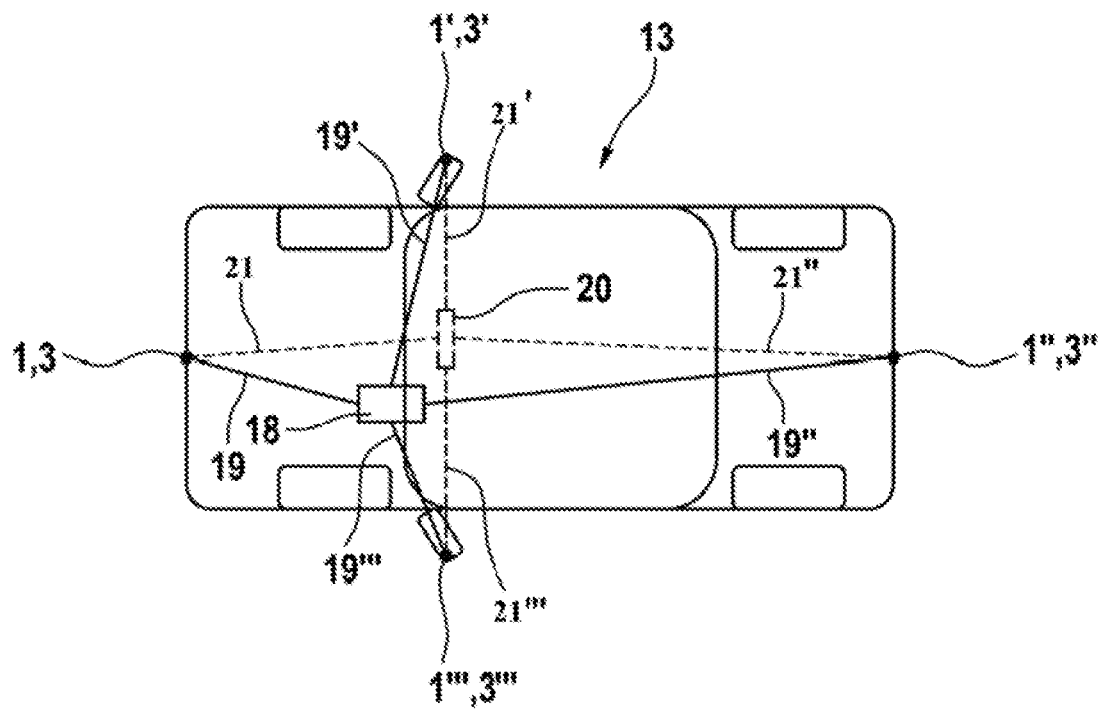
FIG. 6 shows a highly simplified illustration of a sensor system for detecting vehicle surroundings.

In all the figures, the same or equivalent elements and apparatuses, unless stated otherwise, are denoted by the same reference signs.

FIG. 1

FIG. 1 shows a first embodiment of the cleaning apparatus 1 according to the invention for cleaning a surface 2 of a sensor apparatus 3 of a vehicle. In the illustrated exemplary embodiment, the sensor apparatus 3 is a digital camera, and the surface 2 is an outer surface of a camera lens 25. Like every camera lens, this has a central optical or sensor axis 15.

The curvature of the surface 2 of the camera lens 25 is raised slightly above an outer surface region 6 circumferentially surrounding it and is separated therefrom at the outer edge 7. Here, the outer edge 7 is positioned so as to be substantially flush with the outer surface region 6.

In practice, the outer surface region 6 may for example be the outer surface of the vehicle body or of a vehicle component in which the structural unit is installed.

The cleaning apparatus 1 is combined with the sensor apparatus 3 in a common housing 12 to form a common structural unit for the purpose of simplified handling and assemblability. The outwardly directed front surface 11 of the housing 12 is configured so as to be flush with the surrounding outer surface region 6 and is in this way integrated into the latter.

A spray nozzle 5 for discharging a fluid cleaning agent 4, which is able to be fed via a feed line 14, is arranged so as to be stationary and recessed below the outer surface region 6 laterally offset from the sensor axis 15.

Also below the outer surface region 6, there is arranged in the housing 12 a substantially rotationally symmetrical, dome-like flow body 10. Said flow body surrounds the surface 2 radially at the outside and adjoins the latter at the outer edge. The flow body 10 serves for guiding a fluid stream 9 flowing from the spray nozzle 5 to the surface 2 and flowing away from the surface 2. For this purpose, the outer surface of the flow body 10 is inclined, or curved, such that, at the outer edge 7, it is oriented so as to be substantially tangential 27 to the adjoining surface 2.

The mouth opening of the spray nozzle 5 is configured to be as close as possible to, in particular flush with, the outer surface of the flow body 10, and the spraying direction 8 is configured to be tangential or, in this exemplary embodiment, parallel to said outer surface.

Consequently, the fluid stream 9 discharged from the spray nozzle 5 follows the surface profile of the flow body 10 and runs tangentially onto the surface 2 at the outer edge thereof. The resulting impingement angle 16 is ideally equal to 0° or is at least particularly shallow and tending toward 0°.

In the embodiment shown, the flow body 10 is of substantially conical configuration, wherein, within an aspect of the invention, other outer contours which are favorable in terms of flow, for example spherical ones, are also permissible.

In addition to the spray nozzle 5, the cleaning apparatus 1 also comprises a blowing nozzle 23, which is likewise arranged so as to be stationary and below the outer surface region 6. The blowing nozzle 23 serves for blowing out an air stream 24 (see FIG. 4) in the direction of the surface 2 and has the function of blowing away adhering water drops, but also of removing water froth or raindrops from the surface 2, without, for this purpose, the spray nozzle 5 being actuated and in the process the cleaning fluid 4 having to be used.

In the example shown, the blowing nozzle 23 is positioned at a distance from the outer surface of the flow body 10, close to the outer surface region 6. This, for example, avoids blockage of the blowing nozzle 23 by possible dirt residues in the fluid stream 9 flowing away.

The surface 2 is surrounded radially at the outside by the front surface 11 of the housing 12. An annular gap 17 remains between the outer edge 7 and the front surface 11, however, which annular gap borders the surface 2 so as to run along the outer edge 7.

A collecting chamber 22 is integrated in the interior of the housing 12 below the front surface 11. Said collecting chamber serves for collecting the cleaning agent 4, which, after the surface 2 has been cleaned, runs away therefrom on the flow body 10. Here, in the exemplary embodiment shown, the outer surface of the flow body 10 forms one of the boundaries of the collecting chamber 22. The annular gap 17 functions as an inlet to the collecting chamber 22. The liquid collected is removed from the collecting chamber 22 via an outflow connector 28 for the purpose of renewed preparation or controlled disposal.

FIG. 2

FIG. 2 shows an embodiment of the cleaning apparatus 1 in plan view. For the purpose of better illustratability, the front surface 11 of the housing 12 is not shown. The entire cleaning apparatus 1 and in particular the flow body 10 are of substantially rotationally symmetrical configuration, as a consequence of which direction-independent installation in the vehicle is made possible. Only the position of the outflow connector 28 has to be appropriately matched or rotated for this purpose, in order that it is positioned at an inclination angle which is favorable for the emptying of the collecting chamber.

The exemplary embodiment shown has two spray nozzles 5, 5' and two blowing nozzles 23, 23', which are positioned at a distance from one another in a circumferential direction about a sensor axis 15.

In order that, during cleaning operation, the fluid streams 9, 9' able to be generated by the respective spray nozzles 5, 5' do not impede one another and in the process in particular reduce the collection efficiency, the spray nozzles 5, 5' should be actuated alternately. The blowing nozzles 23, 23', by contrast, may also be operated simultaneously since the discharged air does not have to be collected again.

FIG. 3

FIG. 3 shows the embodiment as per FIG. 2, but with the front surface 11. The nozzles situated therebelow are indicated merely by dash-dotted lines. What is noteworthy in particular is the optically reduced and aerodynamically optimized outer region of the cleaning apparatus 1, on which outer region there are no disruptive structures whatsoever. Only the camera lens 25 and the annular gap 17 surrounding the latter appear at the otherwise empty, planar front surface 11.

FIG. 4

FIG. 4 shows the embodiment as per FIG. 1 and serves especially to illustrate the functioning of the cleaning apparatus 1.

The cleaning fluid 4 is conveyed under pressure to the spray nozzle 5 from a supply device (not shown here) via an inflow. The fluid stream 9 then discharged from the spray nozzle 5 flows along the outer surface of the flow body 10 to the surface 2, passes the latter and then flows along the outer surface of the flow body 10 again, on the opposite side thereof and into the collecting chamber 22.

For such a fluid stream 9 oriented close to the surface and tangential thereto, physical effects generally known as the Coandă effect and the Bernoulli effect come into play even at relatively low fluid speeds. These effects lead to the fluid stream 9 being sucked to the domed surface and necessarily following the curvature. The cleaning agent 4, as it were, adheres to said domed surface. In this way, both a high cleaning action and high insensitivity to relative wind are achieved.

The impinging relative wind 26 is consequently not able to effectively act below the fluid stream 9 and divert, disperse or blow away said fluid stream so significantly that the cleaning action would be reduced. The entire surface 2 remains wetted.

FIG. 5

FIG. 5 illustrates a further, highly integrated embodiment of the cleaning apparatus 1. The front surface 11 of the housing 12 is oriented so as to be flush with a body panel. The flow body 10 is formed as an integral constituent part of the housing 12 and has an outer contour which is curved like a dome. Furthermore, the flow body 10 additionally serves as a carrier element for receiving and fixing the sensor apparatus 3 and, for this purpose, has a corresponding receiving seat 29.

The spray nozzle 5, as a mouth opening of the inflow 14 that is formed in a matched manner, is likewise integrated as one part into the housing 12.

FIG. 6

FIG. 6 illustrates by way of example and in a highly simplified manner a preferred possible application of an aspect of the invention within a sensor system 13 for detecting vehicle surroundings.

Multiple structural units comprising in each case one cleaning apparatus and one sensor apparatus 1&3; 1'&3'; 1"&3"; 1'''&3''' are attached at exposed positions of a vehicle so as to make possible 180° circumferential visibility.

A central supply device 18 supplies the cleaning apparatuses 1-1''' with the cleaning agent 4 via corresponding supply lines 19-19''' by means of a conveying pump (not shown). A central control device 20 is connected to the respective sensor apparatuses 3-3''' using dedicated control lines 21-21''', supplies said sensor apparatuses with power in this way, and sends and receives the electrical signals for the purpose of further processing.

LIST OF REFERENCE DESIGNATIONS

1 Cleaning apparatus
2 Surface
3 Sensor apparatus
4 Cleaning agent
5 Spray nozzle
6 Outer surface region
7 Outer edge
8 Spraying direction
9 Fluid stream
10 Flow body
11 Front surface
12 Housing
13 Sensor system
14 Inflow
15 Sensor axis
16 Impingement angle
17 Annular gap
18 Supply device
19 Supply line
20 Control device
21 Control line
22 Collecting chamber
23 Blowing nozzle
24 Air stream
25 Camera lens
26 Relative wind
27 Tangent
28 Outflow connector
29 Receiving seat

The invention claimed is:

1. A cleaning apparatus for cleaning a surface of a sensor apparatus of a vehicle, comprising at least one spray nozzle for discharging a fluid cleaning agent, wherein the surface is delimited by an encircling outer edge, wherein the cleaning apparatus comprises a stationary flow body which serves at least for guiding away a fluid stream flowing away from the surface, wherein the flow body at least sectionally adjoins the outer edge of the surface, wherein, at the outer edge, an outer surface of the flow body is oriented so as to be substantially tangential to the surface such that the outer surface of the flow body and the surface extend along a common line, the common line extending perpendicularly to the encircling outer edge, and wherein the flow body includes the spray nozzle at a position beneath the outer edge of the surface and beneath the outer surface of the flow body.

2. The cleaning apparatus as claimed in claim 1, wherein the flow body simultaneously serves for guiding a fluid stream lowing from the spray nozzle to the surface.

3. The cleaning apparatus as claimed in claim 1, wherein, in relation to the outer surface region, the spray nozzle is positioned so as to be stationary in a recessed manner such that the discharge of the cleaning agent is realized below the outer surface region.

4. The cleaning apparatus as claimed in claim 1, wherein the flow body is formed so as to be substantially curved like a dome or conical.

5. The cleaning apparatus as claimed in claim 1, wherein the outer edge is oriented so as to be substantially flush with a surrounding outer surface region, and the flow body is arranged below the outer surface region.

6. The cleaning apparatus as claimed in claim 1, wherein the cleaning apparatus comprises a housing with a front surface which is configured so as to be flush with the surrounding outer surface region, wherein the surface is at least regionally surrounded by the front surface, and wherein an annular gap is present between the outer edge and the front surface, which annular gap at least sectionally borders the surface so as to run along the outer edge.

7. The cleaning apparatus as claimed in claim 6, wherein the housing has, below the front surface, a collecting chamber for collecting the cleaning agent, wherein an inlet into the collecting chamber is formed by the annular gap.

8. The cleaning apparatus as claimed in claim 1, wherein the cleaning apparatus comprises at least one blowing nozzle for blowing out an air stream in the direction of the surface, which at least one blowing nozzle is arranged in a stationary manner below the outer surface region.

9. The cleaning apparatus as claimed in claim 1, wherein, below the outer surface region, at least two spray nozzles are arranged so as to be stationary in a manner spaced apart from one another in a circumferential direction about a sensor axis.

10. The cleaning apparatus as claimed in claim 1, wherein the sensor apparatus is a digital camera and the surface is an outer surface of a camera lens.

11. A structural unit comprising a cleaning apparatus combined with a sensor apparatus in a common housing, the cleaning apparatus configured for cleaning a surface of the sensor apparatus, the cleaning apparatus comprising at least one spray nozzle for discharging a fluid cleaning agent, wherein the surface is delimited by an encircling outer edge, wherein the cleaning apparatus comprises a stationary flow body which serves at least for guiding away a fluid stream flowing away from the surface, wherein the flow body at least sectionally adjoins the outer edge of the surface, and wherein, at the outer edge, an outer surface of the flow body is oriented so as to be substantially tangential to the surface such that the outer surface of the flow body and the surface extend along a common line, the common line extending perpendicularly to the encircling outer edge, and wherein the flow body includes the spray nozzle at a position beneath the outer edge of the surface and beneath the outer surface of the flow body.

12. A sensor system for detecting vehicle surroundings, comprising at least one cleaning apparatus as claimed in claim 1.

13. A method for operating a cleaning apparatus as claimed in claim 9, wherein, during cleaning operation, the spray nozzles are not actuated simultaneously, in particular are actuated alternately.

14. The cleaning apparatus as claimed in claim 2, wherein, in relation to the outer surface region, the spray nozzle is positioned so as to be stationary in a recessed manner such that the discharge of the cleaning agent is realized below the outer surface region.

15. A sensor system for detecting vehicle surroundings, comprising at least one structural unit as claimed in claim 11.

\* \* \* \* \*